United States Patent
Holdrege

[15] 3,692,779
[45] Sept. 19, 1972

[54] 7-[N-(SUBSTITUTED-IMIDOYL)AMINOACETAMIDE] CEPHALOSPORANIC ACIDS AND DERIVATIVES THEREOF

[72] Inventor: Charles Truman Holdrege, Camillus, N.Y.

[73] Assignee: Bristol-Myers Company, New York, N.Y.

[22] Filed: Aug. 12, 1970

[21] Appl. No.: 63,314

[52] U.S. Cl. ............................. 260/243 C, 424/246
[51] Int. Cl. ............................................ C07d 99/24
[58] Field of Search ................................. 260/243 C

[56] References Cited

UNITED STATES PATENTS

| | | | |
|---|---|---|---|
| 3,454,557 | 7/1969 | Gatchett et al. | 260/239.1 |
| 3,479,339 | 11/1969 | Holdrege | 260/239.1 |
| 3,481,922 | 12/1969 | Holdrege | 260/239.1 |
| 3,483,188 | 12/1969 | McGregor | 260/239.1 |

Primary Examiner—Nicholas S. Rizzo
Attorney—Herbert W. Taylor, Jr., Robert E. Havranek, Richard H. Brink and James Magee, Jr.

[57] ABSTRACT

7-[N-(substituted-imidoyl)aminoacetamido]cephalosporanic acids and their salts and the corresponding betaines and desacetoxy derivatives are valuable as antibacterial agents, nutritional supplements in animal feeds, therapeutic agents in poultry and animals, including man, and are especially useful in the treatment of infectious diseases caused by Gram-positive and Gram-negative bacteria. 7-[N-(Phenylacetimidoyl)aminoacetamido']cephalosporanic acid, a preferred embodiment of the invention, is prepared for example, by Raney nickel hydrogenation (50 p.s.i., R.T.) of an aqueous solution of sodium 7-(3-benzyl-1,2,4-oxadiazole-5-one-4-acetamido)cephalosporanate which is prepared in turn by reaction of 7-aminocephalosporanic acid with 3-benzyl-1,2,4-oxadiazole-5-one-4-acetyl chloride.

21 Claims, No Drawings

7-[N-(SUBSTITUTED-IMIDOYL)AMINOACETAMIDE] CEPHALOSPORANIC ACIDS AND DERIVATIVES THEREOF

BACKGROUND OF THE INVENTION (1) Field of the invention.

The cephalosporins of the present invention possess the usual attributes of such compounds and are particularly useful in the treatment of bacterial infections.

(2) Description of the prior art.

Cephalothin and cephaloridine are well-known antibacterial agents; see U. S. Pat. Nos. 3,218,318; 3,449,338 and 3,498,979. The literature also contains considerable data on the activity of cephaloglycin and cephalexin; see U. S. Pat. Nos. 3,303,193 and 3,507,861 and Great Britain Pat. Nos. 985,747 and 1,054,806. Newer cephalosporins include cefazolin and cephapirin; see U. S. Pat. No. 3,516,997 [and also Netherlands Pat. No. 68/05179 (Farmdoc 34,328) and South Africa Pat. No. 68/4513] and U. S. Pat. No. 3,422,100.

The literature on cephalosporins has been reviewed by E. P. Abraham, Quart Rev. (London) 21, 231 (1967), by E. Van Heyningen, Advan. Drug Res., 4, 1–70, (1967) and briefly in Annual Reports in Medicinal Chemistry, Academic Press, Inc., 111 Fifth Avenue, New York, New York, 10003, by L. C. Cheney on pages 96 and 97 (1967) and by K. Gerzon and R. B. Morin on pages 90–93 (1968). New cephalosporins are frequently reported at the annual Interscience Conference on Antimicrobial Agents and Chemotherapy as illustrated by Sassiver et al., Antimicrobial Agents and Chemotherapy - 1968, American Society for Microbiology, Bethesda, Maryland, pages 101–114 (1969) and by Nishida et al., ibid, 236–243 (1970).

7-($\alpha$-Aminoacetamido)cephalosporanic acid is disclosed in U. S. Pat. No. 3,422,103 and 7-(guanidinoacetamido)cephalosporanic acid in U. S. Pat. No. 3,492,297.

With regard to the cephalosporins used an intermediates in the present invention, numerous methylcephalosporins, ie., 7-acetamidocephalosporanic acids, having attached at the alpha position a heterocyclic ring containing two or three or four hetero-atoms and often other substituents on the heterocyclic nucleus are reported in the literature, e.g., in U. S. Patents classified in sub-class 260–243 as exemplified most recently by U. S. Pat. Nos. 3,499,893; 3,468,874; 3,459,746; 3,464,999; 3,365,449; 3,360,515 and 3,351,597.

The preparation of various 7-[$\alpha$-amino-arylacetamido]cephalosporanic acids and the corresponding desacetoxy compounds in which aryl represents unsubstituted or substituted phenyl or 2- or 3-thienyl is described in British specifications 985,747, 1,017,624, 1,054,806 and 1,123,333, in Belgian Pat. No. 696,026 (Farmdoc No. 29,494), in U. S. Pat. Nos. 3,311,621 and 3,352,858, in Japanese patent 16871/66 (Farmdoc 23,231), by Spencer et al., J. Med. Chem., 9 (5) 746-750 (1966) and by Kurita et al., J. Antibiotics (Tokyo) (A) 19, 243–249 (1966) and see also U. S. Pat. No. 3,485,819.

Netherlands Pat. Nos. 68/11676 (Farmdoc 36,349) and 68/12382 (Farmdoc 36,496) and U. S. Pat. Nos. 3,489,750 and 3,489,751 disclose ring-substituted cephaloglycins.

Various 7-[$\alpha$-amino-arylacetamido]cephalosporins in which one hydrogen of the $\alpha$-amino group is replaced by a carbonyl group which is attached in turn to another moiety have been reported. The earliest were the cephaloglycin and cephalexin precursors in which use was made of a common peptide blocking group such as carbobenzyloxy as illustrated by U. S. Pat. No. 3,364,212, Belgian Pat. No. 675,298 (Farmdoc 22,206), South African Pat. No. 67/1260 (Farmdoc 28,654) and Belgain Pat. No. 696,026 (Farmdoc 29,494). Later examples include my own 7-($\alpha$-3-acylureido-arylacetamido)cephalosporins in my U. S. application Ser. No. 792,757 filed Jan. 21, 1969, and my own 6-[$\alpha$-(3-imidoylureido)arylacetamido] cephalosporins in my U. S. application Ser. No. 855,375 filed Sept. 4, 1969, and the 7-[$\alpha$-(3-guanyl-1-ureido)arylacetamido]cephalosporins of my colleague, Donald Neil McGregor, disclosed in his U. S. application Ser. No. 793,909 filed Jan. 24, 1969.

The penicillins having the same side-chains as the cephalosporins of the present invention are the subject of my U. S. application Ser. No. 50,997 filed June 29, 1970.

SUMMARY OF THE INVENTION

Compounds having the formulas

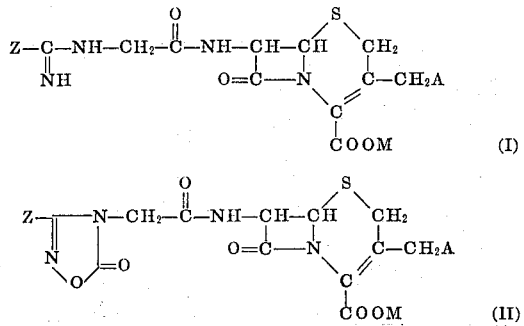

wherein A is hydrogen, acetoxy, 2-(5-methyl-1,3,4-thiadiazolyl)thio, pyridinium, picolinium or lutidinium; M is hydrogen or a pharmaceutically acceptable non-toxic cation or an anionic charge when A is one of said quaternary ammonium radicals; and wherein Z is (lower)alkyl, cycloalkyl having four, five, six or seven carbon atoms, monohalo(lower)alkyl, dichloromethyl, trichloromethyl, (lower)alkenyl of two to six carbon atoms,

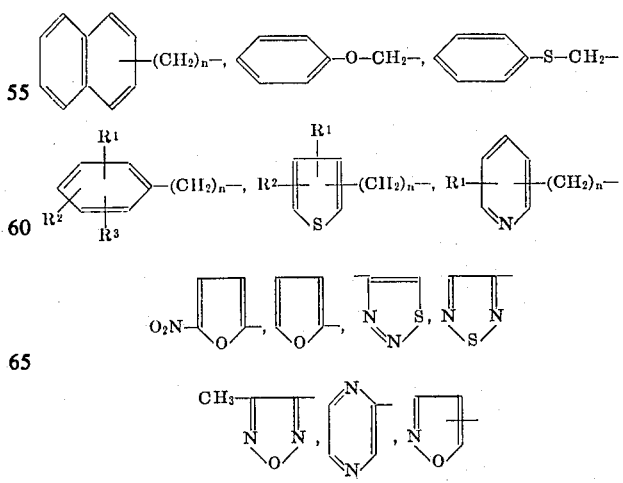

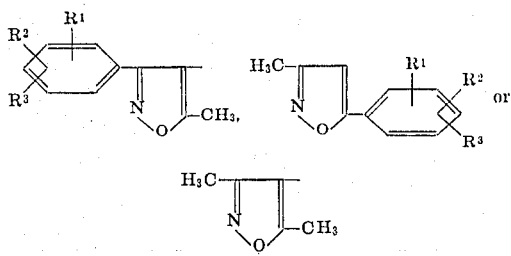

wherein $n$ is zero or one and $R^1$, $R^2$ and $R^3$ each is hydrogen, nitro, di(lower)alkylamino, (lower)alkanoylamino, (lower)alkanoyloxy, (lower)alkyl (comprising straight and branched chain saturated aliphatic groups having from one to six carbon atoms inclusive), amino, hydroxy, (lower)alkylthio, (lower)alkoxy, sulfamyl, chloro, iodo, bromo, fluoro or trifluoromethyl. Typical nontoxic, pharmaceutically acceptable cations include metallic cations such as sodium, potassium, calcium, aluminum, and the like, the ammonium cation and substituted ammonium cations, e.g., cations of such nontoxic amines as tri(lower)alkylamines, i.e., triethylamine, etc., procaine, dibenzylamine, N-benzyl-beta-phenethylamine, 1-ephenamine, N,N'-dibenzylethylenediamine, dehydroabietylamine, N,N'-bisdehydroabietylethylenediamine, N-(lower)alkylpiperidine, e.g., N-ethylpiperidine, or other such amines which have been used to form pharmaceutically acceptable nontoxic salts with benzyl-penicillin. Such salts are preferably made by treatment of the free acid (zwitterion in the compounds of formula I) form of the product with a strong base. In addition the compounds of formula I form acid addition salts including the mineral acid addition salts such as the hydrochloride, hydrobromide, hydroiodide, sulfate, sulfamate and phosphate and the organic acid addition salts such as the maleate, fumarate, malate, mandelate, ascorbate, para-toluenesulfonate, β-naphthalenesulfonate, and the like.

In the preferred embodiments of this invention the compounds exist in the zwitterion form and Z is phenyl, benzyl, thenyl, thienyl, furyl or (lower)alkyl and preferably benzyl, 2-thenyl or 3-thenyl.

The compounds of Formula II above are converted into those of Formula I by hydrogenation and preferably by hydrogenation at about room temperature over Raney nickel catalyst of an aqueous solution of a salt or betaine of the compound of Formula II and preferably a sodium or potassium salt. The hydrogen pressure is preferably about 50 p.s.i. or higher.

The betaines of Formula II are produced by reacting the compounds above in which A is acetoxy with pyridine, picoline or lutidine by the method of Spencer et al., J. Org. Chem., 32, 500 (1967).

The 3-[2-(5-methyl-1,3,4-thiadiazolyl)thiomethyl] compounds are produced by reacting a compound above in which A is acetoxy with half its weight of 5-methyl-2-mercapto-1,3,4-thiadiazole, preferably in an aqueous system, e.g., in phosphate buffer at pH 6.4 for a few hours at 60° C. The desired product precipitates as an oil or a solid.

The compounds of Formula II above can be prepared by direct acylation of 7-aminocephalosporanic acid or 7-amino-3-desacetoxycephalosporanic acid or a salt thereof with an acid chloride of the formula

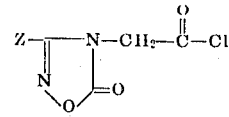

(wherein Z has the meaning set out above) or its functional equivalent as an acylating agent for a primary amino group using the conditions known to the art for the preparation of compounds such as cephalothin and those described in U. S. Pat. No. 3,322,750, for example.

DETAILED DESCRIPTION

It was an object of the present invention to provide compounds useful in the treatment of infections caused by Gram-positive and Gram-negative bacteria, including particularly those caused by enteric organisms.

The compounds of the present invention as defined above under "Summary of the Invention" are particularly useful in that they possess potent antibacterial activity against both Gram-positive and Gram-negative bacteria, and most particularly those having structure I exhibit very potent activity in vitro against enteric organisms which are resistant to the commercially available cephalosporins.

The compounds of the present invention containing the α-(3-substituted-1,2,4-oxadiazole-5-one-4-yl) group are primarily useful as intermediates for the preparation of the corresponding compounds containing the 7- N-(substituted-imidoyl)aminomethyl side chain. The latter are far more potent antibacterial agents.

In the treatment of bacterial infections in man, the compounds of this invention containing the latter side chain are administered topically, orally and especially parenterally in accordance with conventional procedures for antibiotic administration in an amount of from about 5 to 125 mg./kg./day and preferably in the range of 15 to 50 mg./kg./day in divided dosages, e.g., three or four times a day. They are administered in dosage units containing, for example, 125, 250, 500, 1,000 and 2,000 mg. of active ingredient with suitable physiologically acceptable carriers or excipients. The dosage units can be in the form of liquid preparations such as solutions, dispersions, emulsions or in solid form such as tablets, capsules, etc.

The compounds of the present invention are also useful for decontamination of filling machines and containers used for cosmetics and topical drugs to prevent or at least reduce the very common contamination of such products with Gram-negative microorganisms. In such instance, use is made of an aqueous solution having a concentration of at least 1 mgm./ml. and a contact time of at least 1 hour.

The starting acids of the formula

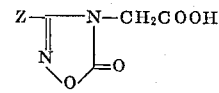

are prepared by standard methods of synthesis from known nitriles by the following reaction scheme wherein Z has the meaning set out above (and as illustrated in the Examples below):

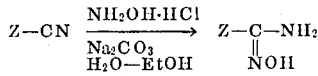

per Beil. 9,304, II 214 and references therein and in Chem. Rev. 62, 155 (1962)

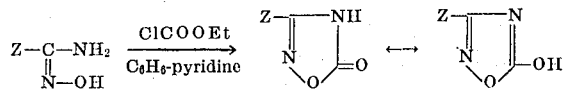

per Beil. 27, 644, II 698 and references therein or via Helv. Chim. Acta 47, 838 (1964) or U. S. Pat. No. 3,264,318 and also according to H. Ulrich, the Chemistry of Imidoyl Halides, Plenum Press, 1968 at pages 86–87 and according to the references therein, and according to Chem. Abst. 65, 18576d.

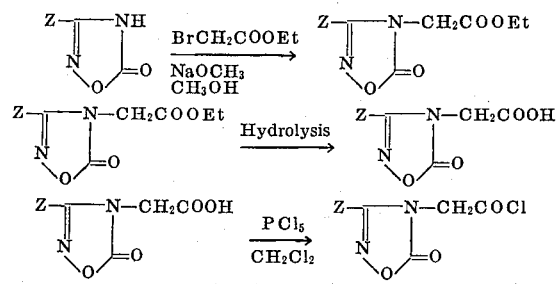

Additional examples of such intermediates found in the literature include the following:

| Structure | References |
|---|---|
| phenyl-C(=NOH)-NH₂ | Beil. 9, 304, II 214. |
| furyl-C(=NOH)-NH₂ | C.A. 52, 7292 b. |
| thienyl-C(=NOH)-NH₂ | Beil. 18, 290. |
| phenyl-CH₂-C(=NOH)-NH₂ | Beil. 9, 446, II 305. |
| phenyl-oxadiazole-OH | Beil. 27, 644, II 698 and references therein. |
| pyridyl-oxadiazole-OH | C.A. 62, P5283 b; Neth. Appl. 6, 402, 833. C.A. 68, P95829 t. |
| phenyl-CH₂-oxadiazole-OH | Beil. 27, II 710. |
| phenyl-CH=CH-oxadiazole-OH | Ber. 22, 2399. |
| (CH₃O)₂-phenyl-oxadiazole-OH | C.A. 68, P95829 t. |
| Br-phenyl-oxadiazole-OH | C.A. 68, 21886 n. C.A. 69, 96597 y. |
| Cl-phenyl-oxadiazole-OH (meta) | C.A. 68, 21886 n. C.A. 69, 96597 y. |
| Cl-phenyl-oxadiazole-OH (ortho) | C.A. 68, 21886 n. C.A. 69, 96597 y. |
| Cl-phenyl-oxadiazole-OH (para) | C.A. 68, 21886 n. |
| F-phenyl-oxadiazole-OH | C.A. 68, 21886 n. C.A. 69, 96597 y. |
| NO₂-phenyl-oxadiazole-OH (ortho) | C.A. 68, 21886 n. C.A. 69, 96597 y. |
| O₂N-phenyl-oxadiazole-OH (para) | C.A. 68, 21886 n. C.A. 69, 96597 y. Berichte, 22, 2418 (1889). |
| thienyl-CH₂CN | Campaigne, McCarthy, JACS 76, 4466 (1954). Campaigne, Le Suer, JACS, 70, 1555 (1948). |
| thienyl-CH₂CN | Blicke, Leonard, JACS, 68, 1934 (1946). Crowe, Nord, J. Org. Chem., 15, 81 (1950). Commercially available (Aldrich). |
| thienyl-CN | Meltzer, Lewis, King, JACS, 77, 4062 (1955). C.A. 43, 3816 (1949). |
| thienyl-CN | MacDowell, Greenwood, J. Hetero. Chem. 2, 44 (1965). |
| furyl-CH₂CN | Commercially available (Aldrich). |
| furyl-CN | Ber. 14, 1058 (1881). |
| pyridyl-CH₂CN | Prijs, Helv. Chim. Acta., 31, 571 (1948). |
| pyridyl-CH₂CN | Commercially available (Aldrich). Burger, Walter, JACS, 72, 1988 (1950). |

| Structure | References |
|---|---|
| (pyridine)-CH₂CN | Winterfeld, Flick. Arch. Pharm. 26, 448 (1956). Sperber et al., JACS, 73, 5752 (1951). |
| 4-CN-pyridine | |
| (pyridine)-CN | Commercially available (Aldrich). |
| (pyridine)-CN | |

Aromatic and aliphatic nitriles are well-known compounds which are prepared, for example, by the methods outlined in classic textbooks such as Organic Preparations by Conrad Weygand, Interscience Publishers, Inc., New York (1945) on pages 115, 255 and 367 and The Chemistry of the Carbon Compounds by Victor Van Richter edited by Richard Anschutz, Third English Edition, Elsevier Publishing Co., Inc., New York, New York (1946) in Volume III at pages 304–306 and in Volume I at pages 325–327 and Laboratory Methods of Organic Chemistry by L. Gattermann revised by H. Wieland, translated from the twenty-fourth edition, MacMillan and Co., Limited. London (1943) at pages 137–138 and by the following procedure:

2-Furamide (11.1 g., 0.1 mole, Eastman Kodak Co.) and phosphorus pentoxide (21 g., 0.15 mole) were mixed and heated with a Meeker burner (gently at first and then more strongly) until 2-cyanofuran distilled at 130°–140° C., 5.6 g.

Such amides are prepared by published methods as illustrated in the following table in which it is to be understood that acids are converted to acid chlorides by treatment with thionyl chloride and acid chlorides are converted to amides by reaction with ammonia;

| Amide | Illustrative sources |
|---|---|
| (1,2,4-triazole)-CONH₂ | Acid, acid chloride, amide: Looker, Wilson, J. Heterocyclic Chem. 2 (4), 348 (1965). Acid, acid chloride, ethyl ester: Hurd, Mori, J. Am. Chem. Soc. 77, 5362 (1955). |
| (thiadiazole)-CONH₂ | Acid, ethyl ester, amide: U.S. 3,060,187. |
| CH₃-(oxadiazole)-CONH₂ | Acid, ethyl ester: Beil. 27, 317 Amide: C.A. 58: 3409. Kochetkov, Sokolov, Luboshnikova, Zh. Obshch. Khim. 32 1778–85 (1962). |
| (oxazole)-CONH₂ | Quilico, Panizzi, Gazz. Chim. Ital. 72, 458 (1942). Quilico, Stagno d'Alcontres, Gazz. Chim. Ital. 79, (1949). Mina, Rateb, Soliman, J. Chem. Soc. 1962, 4234. |
| (pyrazine)-CONH₂ | Amide: commercially available. |
| CH₃-(oxadiazole)-CONH₂ | Amide, acid: Beil. 27, 707. Acid chloride: readily prepared by known methods. |
| phenyl-(oxadiazole)-CH₃-CONH₂ | Acid, acid chloride: Doyle and Naylor, U.S. 2,996,501 and references cited therein. |
| H₃C-(oxadiazole)-phenyl-CONH₂ | Acid, acid chloride: Doyle and Naylor, U.S. 2,996,501 and references cited therein. |

Alternative method for preparing compounds of general formula II

Compounds of general formula II can be prepared by reaction of 7-bromoacetamidocephalosporanic acid with a 3-substituted-1,2,4-oxadiazole-5-one as follows:

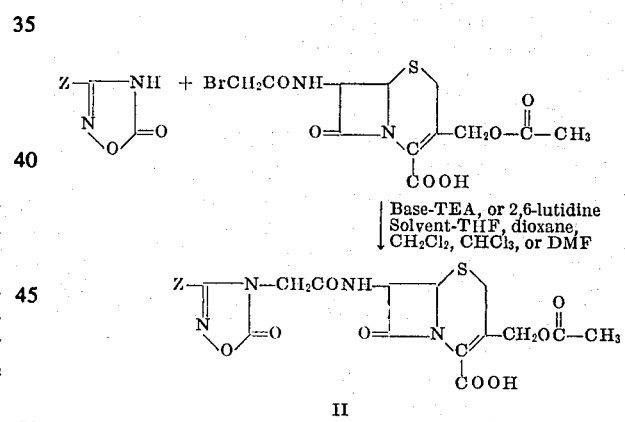

5-Hydroxy-3-(2'-thienyl)-1,2,4-oxadiazole

A mixture of 176.1 g. (1.61 mole) of 2-thienonitrile, 11.9 g. (1.61 mole) of hydroxylamine hydrochloride, 85.3 g. (0.805 mole) of sodium carbonate, 1 liter of 95 percent ethanol and 300 ml. of water was heated at reflux for 17 hours. A small amount of solid was removed by filtration. Additional water was added to the filtrate and the ethanol was stripped off at reduced pressure causing the crystalline product to separate. The filtered product was washed with water. The crude product was heated with benzene most of it going into solution. Cooling this mixture gave after filtration and drying 170.9 g. of 2-thiophenecarboxamide oxime; m.p. 87°–88° (lit ref. Beil. 18, 290).

Ethyl chloroformate (130.2 g., 1.2 mole) was added gradually to a heated and stirred solution of 170.9 g. (1.2 mole) of 2-thiophenecarboxamide oxime, 96.5 ml. of pyridine and 300 ml. of benzene. An exothermic reaction took place which caused the mixture to reflux. The mixture was refluxed for 15 minutes after the addition of ethyl chloroformate was complete. The mixture was cooled slightly and 600 ml. of water was added. The benzene was distilled off and the remaining aqueous mixture was refluxed for 2.5 hours. After cooling overnight the product was filtered and washed with water. The crude product was dissolved in dilute aqueous sodium hydroxide, the solution carbon treated, and reprecipitated by acidification with acetic acid. There was obtained 139.4 g. of 5-hydroxy-3-(2'-thienyl)-1,2,4-oxadiazole; m.p. 185°–190° dec. The nuclear magnetic resonance and infrared spectra were consistent for the desired compound.

3-(2'-Furyl)-5-hydroxy-1,2,4-oxadiazole

A mixture of 69.5 g., (0.746 mole) of 2-furylnitrile [Ber. 14, 1058 (1881)], 51.8 g. (0.746 mole) of hydroxylamine hydrochloride, 39.5 g. (0.373 mole) of sodium carbonate, 500 ml. of 95 percent ethanol and 150 ml. of water was refluxed overnight. The mixture was filtered and 150 ml. of water was added. The ethanol water stripped off at reduced pressure. The aqueous phase was extracted several times with ethyl acetate. The combined organic extracts were carbon treated, dried with sodium sulfate and the solvent removed at reduced pressure leaving 88.9 g. of 2-furylamide oxime as a viscous oil (lit. ref. C.A. 52, 7292b).

Ethyl chloroformate (76.5 g., 0.705 mole) was added slowly to a heated and stirred solution of 88.9 g. of 2-furylamide oxime, 56.7 ml. (0.705 mole) of pyridine and 200 ml. of benzene. After the addition of ethyl chloroformate was complete the reaction mixture was refluxed an additional 15 minutes. Water (400 ml.) was added and the benzene distilled off. The remaining aqueous mixture was refluxed for 2.5 – 3 hours. After cooling in an ice bath the solid product was collected by filtration and washed with water. The product was dissolved in dilute aqueous sodium hydroxide solution, carbon treated, the solution acidified with acetic acid with ice cooling and the reprecipitated product filtered and washed carefully with ice water. The product was again purified in the same manner giving after drying in vacuo over phosphorus pentoxide 50.1 g. of 3-(2'-furyl)-5-hydroxy-1,2,4-oxadiazole; dec. above 210°.

Anal. Calcd. for $C_6H_4N_2O_3$: C, 47.37; H, 2.65; N, 18.42.

Found: C, 47.27; H, 2.91; N, 18.39.

Illustrative examples of the preparation of compounds of the present invention follow. These examples are given in illustration of, but not in limitation of, the present invention. All temperatures are in degrees Centigrade. "Skellysolve B" is a petroleum ether fraction of b.p. 60° – 68° C. consisting essentially of n-hexane.

DESCRIPTION OF THE PREFERRED EMBODIMENTS

EXAMPLE 1

3-Benzyl-1,2,4-oxadiazole-5-one

A solution of 117.2 g. (1 mole) of phenylacetonitrile in 200 ml. of 95 percent ethanol was added to a stirred mixture of 69.5 g. (1 mole) of hydroxylamine hydrochloride, 53 g. (0.5 mole) of sodium carbonate, 200 ml. of water and 400 ml. of 95 percent ethanol. The mixture was heated at reflux for 3.5 hours, stored at room temperature for 2 days then refluxed for 3 hours longer. The ethanol was distilled off at reduced pressure. Benzene was added to the residue and the aqueous layer was removed. The benzene solution containing phenylacetamide oxime was dried with sodium sulfate, filtered, and concentrated to a volume of about 400 ml. Reference to phenylacetamide oxime: Beil. 9, 446, II 305.

Ethyl chloroformate (96 ml., 1 mole) was added gradually from a dropping funnel to the above prepared solution of phenylacetamide oxime in benzene plus 80.5 ml. (1 mole) of pyridine initially at room temperature. The exothermic reaction caused the mixture to reflux. The mixture was refluxed for 15 minutes longer, cooled somewhat and 500 ml. of water added. The benzene was distilled off and the remaining aqueous mixture was heated at reflux for 2.5 hours longer. The oil which separated was extracted into benzene. The benzene phase was extracted with 175 ml. of 20 percent sodium hydroxide solution and then with 50 ml. of water. The combined basic extracts were acidified with acetic acid giving oily crystals. The crude product was recrystallized from benzene; m.p. 80°–94°, yield 41 g. The product was combined with 100 ml. of water and 50 ml. of 20 percent sodium hydroxide solution and the mixture heated for 1 hour on the steam bath. The cooled solution was acidified with acetic acid. An additional 100 ml. of water was added to make the mixture more fluid. The product was collected by filtration. The damp filter cake was dissolved in about 500 ml. of chloroform with warming. The solution was dried with sodium sulfate, filtered, and the solvent distilled off at reduced pressure. The residue was extracted with three 250 ml. portions of boiling cyclohexane and with 500 ml. of boiling 1:1 cyclohexane-benzene. The insoluble residue was slurried with cyclohexane and collected by filtration. There was obtained 25.2 g. of 3-benzyl-1,2,4-oxadiazole-5-one; m.p. 109°–112° (Beil. 27, II 710 reports m.p. 115°). The infrared spectrum was consistent for the desired product.

3-Benzyl-1,2,4-oxadiazole-5-one-4-acetic acid

A solution of 25 g. (0.142 mole) 3-benzyl-1,2,4-oxadiazole-5-one in 300 ml. of methanol was stirred with 20 g. of powdered Molecular Sieves (Linde 4A) for 1 hour at room temperature. The Molecular Sieves were removed by filtration. To the stirred filtrate was added 8.45 g. (0.156 mole) of sodium methoxide and then 26.2 g. (0.156 mole) of ethyl bromoacetate. The mixture was heated at reflux for 18 hours. The solvent was distilled off at reduced pressure. To the residue was added 200 ml. of acetic acid and 100 ml. of 6 N hydrochloric acid and the mixture refluxed for 1.5 hours. The solvents were distilled off at reduced pressure. To the residue was added water and benzene causing the product to crystallize. The product was filtered, washed on the filter with water and benzene and air dried. The crude product was recrystallized from toluene with a carbon treatment giving 15.9 g. of white crystalline product after drying in vacuo over phosphorus pentoxide; m.p. 111°–113°. The infrared and nuclear magnetic resonance spectra were consistent for the desired product.

Anal Calcd. for $C_{11}H_{10}N_2O_4$: C, 56.41; H, 4.30, N, 11.96

Found: C, 56.61; H, 4.42; N, 12.21.

3-Benzyl-1,2,4-oxadiazole-5-one-4-acetyl chloride

A solution of 5.0 g. (0.0214 mole) of 3-benzyl-1,2,4-oxadiazole-5-one-4-acetic acid in 200 ml. of methylene chloride was gassed briefly (2 minutes) with hydrogen chloride. To the resulting clear solution was added 5.8 g. (0.0278 mole) of phosphorus pentachloride (effervescence) and the mixture stored at room temperature for 1 hour with occasional swirling. The solvent was stripped off at reduced pressure. The crystalline residue was triturated with cyclohexane and dried at reduced pressure. The infrared spectrum (nujol) was consistent for the desired acid chloride.

Sodium 7-(3-benzyl-1,2,4-oxadiazole-5-one-4-acetamido)cephalosporanate

A solution of 3-benzyl-1,2,4-oxadiazole-5-one-4-acetyl chloride (prepared from 5.0 g., 0.0214 mole of the acid) in 100 ml. of acetone was added all at once to a rapidly stirred mixture of 5.72 g. (0.0214 mole) of 7-aminocephalosporanic acid, 7.2 g., (0.0856 mole) of sodium bicarbonate, 150 ml. of water and 50 ml. of acetone at room temperature. After stirring for 45 minutes the reaction mixture was extracted twice with ethyl acetate. The aqueous phase was layered with ethyl acetate and acidified with 42 percent phosphoric acid. Insoluble material was removed by filtration prior to separation of the phases. The aqueous phase was extracted twice more with ethyl acetate. The combined ethyl acetate extracts were washed three times with water, dried with sodium sulfate, filtered and treated with 7.6 ml. (0.02 mole) of sodium 2-ethylhexanoate in 1-butanol. After about one-half hour the mixture was concentrated somewhat and the product collected by filtration, washed with ethyl acetate and dried in vacuo over phosphorus pentoxide; yield 6.4 g., decomposes 215°–220° with prior darkening above about 160°. The infrared and nuclear magnetic resonance spectra were consistent for the desired product.

Anal. Calcd. for $C_{21}H_{19}N_4O_8SNa$: C, 49.41; H, 3.75; N, 10.98.

Found: C, 48.89; H, 3.86; N, 10.86.

7-[N-(Phenylacetimidoyl)aminoacetamido]cephalosporanic acid

A solution of 5.2 g. of sodium 7-(3-benzyl-1,2,4-oxadiazole-5-one-4-acetamido)cephalosporanate in 200 ml. of water was hydrogenated in the presence of commercial Raney nickel catalyst (No. 28) on a Parr hydrogenation apparatus at an initial pressure of 50 p.s.i. for 1 hour at room temperature. The catalyst was removed by filtration. The filtrate was adjusted to pH 3 with 6 N hydrochloric acid and then to pH 4.2 with 20 percent aqueous sodium hydroxide. The solution was concentrated to a small volume. A small amount of solid was removed by filtration. The filtrate was concentrated to dryness. Ethyl acetate was added to the residue and then distilled off to remove the last traces of water. The ethyl acetate treatment was repeated once; yield 3.2 g. The infrared and nuclear magnetic resonance spectra were consistent for the desired product.

EXAMPLE 2

5-Hydroxy-3-phenyl-1,2,4-oxadiazole

A solution of 103.1 g. (1 mole) of benzonitrile in 400 ml. of 95 percent ethanol was added to a mixture of 53 g. (0.5 mole) of sodium carbonate, 69.5 g. (1 mole) of hydroxylamine hydrochloride, 200 ml. of water and 300 ml. of 95 percent ethanol. The mixture was refluxed for 18 hours. Most of the ethanol was distilled off and additional water was added. The product, which crystallized on cooling, was filtered, washed with water, and air dried. The product was dissolved in benzene and the benzene distilled off to remove any remaining water leaving a crystalline residue of benzamide oxime (lit. ref. Beil. 9, 304, II 214).

Ethyl chloroformate (96 ml., 1 mole) was added gradually from a dropping funnel to a stirred solution of benzamide oxime in 250 ml. of warm benzene plus 80.5 ml. (1 mole) of pyridine. The exothermic reaction caused the reaction mixture to reflux. The mixture was refluxed for 15 minutes longer, cooled somewhat, and 500 ml. of water added. The benzene was distilled off. The aqueous mixture remaining was refluxed for 2.5 hours. After cooling in an ice bath the crystalline product was collected by filtration. The crude product was purified by dissolving in dilute aqueous sodium hydroxide and acidifying with acetic acid; yield 122.9 g., m.p. 196°–200° (lit ref. Beil. 27, 644, II 698).

3-Phenyl-1,2,4-oxadiazole-5-one-4-acetic acid

A mixture of 32.2 g., (0.193 mole) of ethyl bromoacetate, 10.5 g. of sodium methoxide, 28.5 g. (0.176 mole) of 5-hydroxy-3-phenyl-1,2,4-oxadiazole and 300 ml. of methanol was heated at reflux for 4 hours and then stored at room temperature overnight. To the reaction mixture was added 10 g. of sodium hydroxide and 30 ml. of water. The solution was heated at reflux for 1.5 hours. Water (70 ml.) was added and the methanol distilled off at reduced pressure. Acidification of the aqueous concentrate with 6 N hydrochloric acid gave an oily crystalline precipitate which was filtered and air dried (solid A); yield 29 g. A second crop of product precipitated from the filtrate (solid B); yield 2.1 g. The infrared spectrum of solid B was consistent for 3-phenyl-1,2,4-oxadiazole-5-one-4-acetic acid.

Solid A was recrystallized from 1:1 95 percent ethanol water with a carbon treatment giving 7.8 g. of 5-hydroxy-3-phenyl-1,2,4-oxadiazole as the first crop. The filtrate deposited a second crop (8.9 g.) (solid C) which had an infrared spectrum consistent for 3-phenyl-1,2,4-oxadiazole-5-one-4-acetic acid. Solid C was recrystallized by dissolving in ethyl acetate and diluting with a large volume of "Skellysolve B". The material which immediately separated (solid D) was removed. The filtrate was stored in the cold to allow the product to crystallize; yield 3.8 g. The infrared and nuclear magnetic resonance spectra were fully consistent for 3-phenyl-1,2,4-oxadiazole-5-one-4-acetic acid.

Anal. Calcd. for $C_{10}H_8N_2O_4 \cdot 1/2\ H_2O$: C, 52.40; H, 3.96; N, 12.23; $H_2O$, 3.93.

Found: C, 52.37; H, 4.76; N, 12.50; $H_2O$, 3.26.

Solid D was purified with ethyl acetate-"Skellysolve B" as described giving additional product. The filtrate from solid C was concentrated to dryness and the residue purified with ethyl acetate-"Skellysolve B". Thus an additional 2.8 g. of 3-phenyl-1,2,4-oxadiazole-5-one-4-acetic acid was obtained.

3-Phenyl-1,2,4-oxadiazole-5-one-4-acetyl chloride

A suspension of 1.0 g. (0.00455 mole) of 3-phenyl-1,2,4-oxadiazole-5-one-4-acetic acid in 50 ml. of methylene chloride was gassed briefly with hydrogen chloride and 1.1 g. (0.00528 mole) of phosphorus pentachloride added. The mixture was stored at room temperature for 2 hours. The solvent was distilled from the resulting clear solution leaving the acid chloride as an oil.

Potassium 7-(3-phenyl-1,2,4-oxadiazole-5-one-4-acetamido)cephalosporanate

A solution of 3-phenyl-1,2,4-oxadiazole-5-one-4-acetyl chloride prepared from 1 g. of the acid in 10 ml. of acetone was added to a solution of 1.24 g. (0.00455 mole) of 7-aminocephalosporanic acid, 1.5 g. of sodium bicarbonate, 30 ml. of water and 20 ml. of acetone at room temperature with rapid stirring. After stirring for 0.5 hour the reaction mixture was diluted with 30 ml. of water and extracted once with ethyl acetate. The aqueous phase was layered with ethyl acetate and acidified with 42 percent phosphoric acid. Two more extractions with ethyl acetate were made. The combined ethyl acetate extracts were washed three times with water, dried with sodium sulfate, filtered and treated with 1.7 ml. (0.00455 mole) of potassium 2-ethylhexanoate in 1-butanol giving an oil which slowly crystallized. The mixture was concentrated slightly and fresh ethyl acetate added. The crystalline product was filtered, washed with ethyl acetate, dried in vacuo over phosphorus pentoxide and further dried in vacuo at 60° for 3 hours; yield 1.58 g., decomposes 145°–150° with prior darkening above about 135°. The infrared and nuclear magnetic resonance spectra were consistent for the desired product.

Anal. Calcd. for $C_{20}H_{17}N_4O_6SK \cdot 2H_2O$: C, 43.79; H, 3.86; N, 10.21.

Found: C, 44.15; H, 4.37; N, 10.71.

7-[N-(Benzimidoyl)aminoacetamido]cephalosporanic acid

A solution of 1.0 g. of potassium 7-(3-phenyl-1,2,4-oxadiazole-5-one-4-acetamido)cephalosporanate in 150 ml. of water was hydrogenated for 3 hours in the presence of commercial Raney nickel catalyst (No. 28) on a Parr hydrogenation apparatus at room temperature at an initial pressure of 50 p.s.i. The catalyst was removed by filtration and washed well with water. The filtrate was adjusted to pH 5 with 6 N hydrochloric acid, concentrated to a small volume, readjusted to pH 5, and concentrated to dryness. The residue was triturated with anhydrous ether and acetone, filtered, and dried in vacuo over phosphorus pentoxide; yield 0.8 g., decomposes 140°–145° with prior darkening above about 130°. The infrared and nuclear magnetic resonance spectra were consistent for the desired product.

Example 3

3-(p-Chlorobenzyl)-1,2,4-oxadiazole-5-one

A solution of 151.6 g. (1 mole) of p-chlorophenylacetonitrile in 200 ml. of 95 percent ethanol was added to a stirred mixture of 69.5 g. (1 mole) of hydroxylamine hydrochloride, 53 g. (0.5 mole) of sodium carbonate, 200 ml. of water and 400 ml. of 95 percent ethanol. The mixture was heated at reflux for 19 hours. Most of the ethanol was stripped off at reduced pressure causing the crude p-chlorophenylacetamide oxime to separate as an oil. The product was extracted into 600 ml. of benzene. The benzene extract was washed two times with water. The product which started to crystallize from the benzene phase was kept in solution by warming. The benzene solution was concentrated to about 400 ml.

Ethyl chloroformate (108.5 g., 1 mole) was added dropwise to a stirred mixture of the above prepared solution of p-chlorophenylacetamide oxime in benzene plus 80.5 ml. (1 mole) of pyridine. The reaction mixture was brought to reflux after about three-quarters of the ethyl chloroformate had been added. The mixture was refluxed for 25 minutes after the addition was completed. The mixture was cooled to room temperature and 500 ml. of water were added. The benzene was distilled off. The aqueous residue was heated at reflux for 2 hours. The reaction mixture was cooled in an ice bath and the aqueous phase decanted from the oil. To the residual oil was added a solution of 45 g. of sodium hydroxide in 500 ml. of water and the mixture refluxed for 2 hours. The cooled mixture was adjusted to pH 3–4 with concentrated hydrochloric acid. The product was collected by filtration and washed with water. The product was dissolved in 500 ml. of boiling benzene, the hot solution filtered and the filtrate diluted with 500 ml. of cyclohexane giving 56 g. of product. The crude product was recrystallized from 1:1 95 percent ethanol-water with a carbon treatment and then from benzene. The product was dissolved in dilute aqueous sodium hydroxide and the filtered solution was acidified with glacial acetic acid; m.p. 168°–172°, yield, after drying in vacuo over phosphorus pentoxide, 21.6 g. The infrared and nuclear magnetic resonance spectra were consistent for 3-(p-chlorobenzyl)-1,2,4-oxadiazole-5-one.

Anal. Calcd. for $C_9H_7ClN_2O_2$: C, 51.32; H, 3.35; N, 13.30

Found: C, 51,46; H, 3.63; N, 13.46, 13.53.

The combined benzene filtrates deposited a second crop of product which was purified by dissolving in dilute sodium hydroxide and reprecipitating with acetic acid; yield 3.2 g., m.p. 166°–170°.

3-(p-Chlorobenzyl)-1,2,4-oxadiazole-5-one-4-acetic acid

A solution of 23.2 g. (0.0992 mole) of 3-(p-chlorobenzyl)-1,2,4-oxadiazole-5-one in 450 ml. of methanol was stirred at room temperature with 20 g. of powdered Molecular Sieves (Linde 4A) for 1.5 hours. The Molecular Sieves were removed by filtration. The filtrate was added to a freshly prepared solution of sodium methoxide in methanol made by adding 2.5 g. (0.11 mole) of sodium to 100 ml. of methanol. Ethyl bromoacetate (18.4 g., 0.11 mole) was added. The stirred mixture was refluxed for 19 hours in an apparatus protected from atmospheric moisture. The solvent was distilled off at reduced pressure. To the residue was added 200 ml. of glacial acetic acid and 100 ml. of 6 N hydrochloric acid and the mixture heated at reflux for 2 hours. The volatile materials were stripped off at reduced pressure. Water and benzene were added to the residue causing the product to crystallize. The product was filtered, washed with water and benzene and twice recrystallized from toluene with a carbon treatment each time; yield 8.9 g., m.p. 145°–149°. The infrared and nuclear magnetic resonance spectra were fully consistent for the desired product.

Anal. Calcd. for $C_{11}H_9ClN_2O_4$: C, 49.18; H, 3.38; N, 10.43

Found: C, 49.43; H, 3.54; N, 10.68 10.69.

Sodium 7-[3-(p-chlorobenzyl)-1,2,4-oxadiazole-5-one-4-acetamido]cephalosporanate A suspension of 4.0 g. of 3-(p-chlorobenzyl)-1,2,4-oxadiazole-5-one-4-acetic acid in 200 ml. of methylene chloride was gassed for about 1 minute with hydrogen chloride. Phosphorus pentachloride (4.04 g.) was added (effervescence) and the reaction mixture was stored at room temperature for 2 hours with occasional swirling. The solvent was stripped off at reduced pressure. The residual oil was triturated with cyclohexane and dried in vacuo to remove the last traces of solvent leaving 3-(p-chlorobenzyl)-1,2,4-oxadiazole-5-one-4-acetyl chloride as residue.

A solution of the acid chloride in 90 ml. of acetone was added in one portion to a rapidly stirred mixture of 4.07 g. of 7-aminocephalosporanic acid, 5.02 g. of sodium bicarbonate, 150 ml. of water and 60 ml. of acetone at room temperature. After stirring for 20 minutes the mixture was extracted three times with ethyl acetate. The aqueous phase was layered with ethyl acetate and acidified with 42 percent phosphoric acid. Two more extractions were made on the aqueous phase with ethyl acetate. The solid which had separated on acidification was removed by filtration during the second extraction. The combined ethyl acetate extracts were washed three times with water, dried with sodium sulfate, filtered, treated with 5.6 ml. (0.0149 mole) of sodium 2-ethylhexanoate in 1-butanol and concentrated somewhat giving a crystalline precipitate. The precipitate was filtered, washed with ethyl acetate and was concluded to be mostly the sodium salt of the side chain acid; yield 1.2 g. The filtrate was stripped of solvent at reduced pressure. The residue was triturated with anhydrous ether giving 3.3 g. of solid. The solid was extracted at room temperature with 150 ml. of acetone. A small amount of insoluble material was filtered off. The acetone filtrate was stripped of solvent. The residue was triturated with anhydrous ether, filtered and dried in vacuo over phosphorus pentoxide; yield 2.8 g., m.p. 155°–160° decomp. The infrared and nuclear magnetic resonance spectra were consistent for sodium 7-[3-(p-chlorobenzyl)-1,2,4-oxadiazole-5-one-4-acetamido]cephalosporanate.

7-[N-(pChlorophenylacetimidoyl)aminoacetamido]cephalosporanic acid

A solution of 2.6 g. of sodium 7-[3-(p-chlorobenzyl)-1,2,4-oxadiazole-5-one-4-acetamido]cephalosporanate in 200 ml. of water was hydrogenated in the presence of commercial Raney nickel catalyst (No. 28) on a Parr hydrogenation apparatus at an initial pressure of 50 p.s.i. for 2 hours at room temperature. The catalyst was removed by filtration. The filtrate was adjusted to pH 2.5 with 6 N hydrochloric acid and a small amount of solid filtered off. The filtrate was adjusted to pH 4 with 20 percent sodium hydroxide and concentrated to dryness. Ethyl acetate was added to the residue and this distilled off at reduced pressure to remove water. This was repeated with acetone. Water (15 ml.) was added to the residue. The resulting gummy partially crystalline solid was collected by filtration and washed with water. The solid was triturated with acetone, three times with 1:1 95 percent ethanol-acetone and washed well with acetone giving a crystalline product. The product was dried in vacuo over phosphorus pentoxide and further dried for 4 hours in a vacuum oven at 60°; yield 0.84 g., decomposes 195°–210° with darkening above about 170°. The infrared and nuclear magnetic resonance spectra were consistent for 7-[N-(p-chlorophenylacetimidoyl)aminoacetamido]cephalosporanic acid.

Anal. Calcd. for $C_{20}H_{21}ClN_4O_6S \cdot 1/2\ H_2O$; C, 49.03; H, 4.53 N, 11.44; $H_2O$, 1.84.

Found: C, 49.15; H, 4.85; N, 11.52, 11.46; $H_2O$, 1.57.

EXAMPLE 4

3-Benzyl-1,2,4-oxadiazole-5-one

Phenylacetonitrile (235 g., 2 moles) was added to a stirred mixture of 167 g. (2.4 moles) of hydroxylamine hydrochloride 127 g. (1.2 mole) of sodium carbonate, 1 l of methanol and 600 ml. of water. The stirred mixture was heated at 50° (solution) for 21 hours. The methanol was distilled off at reduced pressure. The crude amide oxime which separated as an oil was extracted into 700 ml. of chloroform. The chloroform extract was washed 3 times with water, dried with sodium sulfate, filtered and about 200 ml. of solvent distilled off at reduced pressure to remove any remaining water leaving a dry solution of phenylacetamide oxime in chloroform.

Ethyl chloroformate (190 ml., 2 moles) was added in a slow stream to a stirred and cooled (25°–30°) solution of the above obtained chloroform solution of phenylacetamide oxime, an additional 1.5 l of chloroform and 280 ml. (2 moles) of triethyl amine. The solution was concentrated at reduced pressure (in 3 batches) until a thick residue of product and triethylamine hydrochloride remained. The batches were combined and extracted 3 times with water. The chloroform-product phase was stripped at reduced pressure to remove the remainder of the solvent. To the residue was added a solution of 120 g. of sodium hydroxide in 1 l. of water. The vigorously stirred mixture was heated rapidly during about 10 minutes to 70°–80° causing most of the material to go into solution. The cooled (25°) mixture was extracted once with 300 ml. of benzene to remove a small amount of insoluble oil. The ice cooled aqueous phase was acidified (pH 2–3) with concentrated hydrochloric acid. The product was collected by filtration, washed with water and air dried; yield 153.1 g. The product was suspended in 800 ml. of water and aqueous sodium hydroxide solution (69 g. of sodium hydroxide in 200 ml. of water) added in slight excess of the amount needed to dissolve all of the solid. The solution was carbon treated, filtered and acidified with concentrated hydrochloric acid. The product was filtered, washed with water and air dried; yield 119.6 g., m.p. 111°–114°.

3-Benzyl-1,2,4-oxadiazole-5-one-4-acetic acid

A solution of 10 g. (0.057 mole) of 3-benzyl-1,2,4-oxadiazole-5-one, 10.4 g. (0.0625 mole) of ethyl bromoacetate and 8.8 ml. (0.0625 mole) of triethylamine in 100 ml. of tetrahydrofuran was stirred at room temperature for 5 hours. During this time a thick precipitate of triethylamine hydrobromide formed. After storage at room temperature for 64 hours the solid was removed by filtration. The filtrate was concentrated at reduced pressure to remove solvent. The residue of crude ethyl 3-benzyl-1,2,4-oxadiazole-5-one-4-acetate was combined with 80 ml. of glacial acetic acid and 40 ml. of 6 N hydrochloric acid and the solution refluxed for 1.5 hours. The volatile materials were distilled off at reduced pressure. An infrared spectrum of the residue indicated that the hydrolysis of the ester was incomplete. Therefore, 80 ml. of glacial acetic acid and 40 ml. of 6 N hydrochloric acid were added and the solution was refluxed for 2.5 hours. The volatile materials were removed at reduced pressure. Water and benzene were added to the residue and the mixture stored at room temperature overnight to crystallize the product. After cooling in an ice bath the product was filtered and air dried. Recrystallization from toluene with a carbon treatment gave 8.0 g. (60 percent yield) of 3-benzyl-1,2,4-oxadiazole-5-one-4-acetic acid; m.p. 113°–115°.

7-(3-Benzyl-1,2,4-oxadiazole-5-one-4-acetamido)desacetoxycephalosporanic Acid

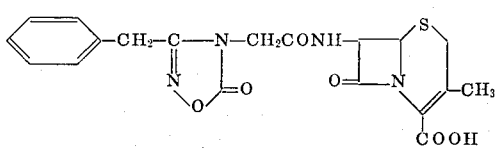

A solution of 5.0 g. (0.0214 mole) of 3-benzyl-1,2,4-oxadiazole-5-one-4-acetic acid in 200 ml. of methylene chloride was gassed briefly (about 2 minutes) with hydrogen chloride. Phosphorus pentachloride (5.8 g., 0.0278 mole) was added (effervescence) and the mixture stored at room temperature for 1.5 hours with occasional swirling. The solvent was stripped off at reduced pressure. The crystalline residue of 3-benzyl-1,2,4-oxadiazole-5-one-4-acetyl chloride was triturated with cyclohexane and dried at reduced pressure. A solution of the acid chloride in 90 ml. of acetone was added all at once to a rapidly stirred solution of 4.58 g. (0.0214 mole) of 7-aminodesacetoxycephalosporanic acid, 7.2 g. (0.0856 mole) of sodium bicarbonate, 150 ml. of water and 60 ml. of acetone at room temperature. After 20 minutes the reaction mixture was extracted once with ethyl acetate whereupon the sodium salt of the product crystallized from the aqueous phase. The aqueous phase together with the precipitate which had formed was layered with ethyl acetate and acidified with 42 percent phosphoric acid. Three extractions using a total of ca. 800 ml. of ethyl acetate were made. The combined ethyl acetate extracts were washed 3 times with water, dried with sodium sulfate, filtered and treated with 8.1 ml. (0.0214 mole) of sodium 2-ethylhexanoate in 1-butanol giving a precipitate. To this mixture was added 7 ml. of water resulting in a crystalline solid. The mixture was concentrated to about 500 ml. and the crystalline sodium 7-(3-benzyl-1,2,4-oxadiazole-5-one-4-acetamido)desacetoxycephalosporanate collected by filtration, washed with acetone and air dried; yield 7.6 g. The filtrate was concentrated at reduced pressure. The oily crystalline residue was triturated with anhydrous ether giving 0.8 g. of sodium salt.

Both crops of sodium salt were combined (8.4 g.) and dissolved in 150 ml. of water by slight warming. The solution was cooled in an ice bath, acidified with 42 percent phosphoric acid (causing the free acid to precipitate) and 150 ml. of acetone added giving a solution. The solution was concentrated somewhat on a flash evaporator until the free acid started to crystallize. After 2 hours at 0° the product, 7-(3-benzyl-1,2,4-oxadiazole-5-one-4-acetamido)desacetoxycephalosporanic acid, was filtered, washed with a small amount of water, air dried, and dried in vacuo over phosphorus pentoxide; yield 4.31 g., decomposes 208°–210° with prior darkening above about 200°. The infrared and nuclear magnetic resonance spectra were consistent for the desired compound.

EXAMPLE 5

7-[N-(Phenylacetimidoyl)aminoacetamido]desacetoxycephalosporanic acid

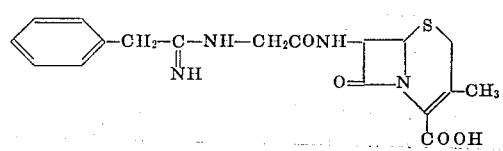

A suspension of 4.16 g. of 7-(3-benzyl-1,2,4-oxadiazole-5-one-4-acetamido)desacetoxycephalosporanic acid in 150 ml. of water was adjusted to pH 7 with solid sodium bicarbonate causing most of the material to dissolve. Dioxane (50 ml.) was added and the slightly turbid solution was hydrogenated in the presence of commercial Raneey nickel catalyst (No. 28) on a Parr hydrogenation apparatus at room temperature at an initial pressure of 50 p.s.i. for 1 hour. The catalyst was removed by filtration. The filtrate was adjusted to pH 4.3 with 6 N hydrochloric acid, concentrated to about one half of its initial volume, again adjusted to pH 4.3, and further concentrated to a small volume causing the product to precipitate. The product was filtered, washed with water and acetone, dried in vacuo over phosphorus pentoxide and further dried in a vacuum oven at 60° for 4 hours; yield 1.96 g., decomposes 184°–186° with prior darkening above about 170°. The infrared and nuclear magnetic resonance spectra were consistent for the desired compound.

EXAMPLE 6

The procedures of Example 2 are repeated while replacing the benzonitrile used therein with an equimolar weight of the nitrile prepared by $P_2O_5$ dehydration of each of the corresponding amides having the following structures:

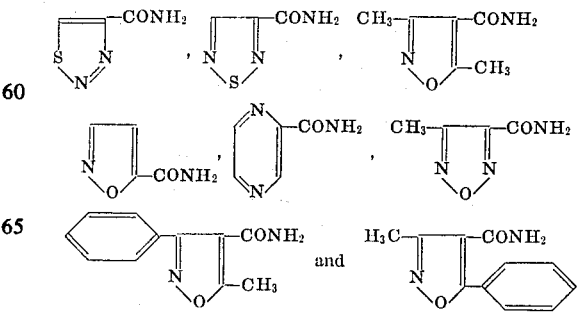

and to produce, respectively, the compounds of the formulae

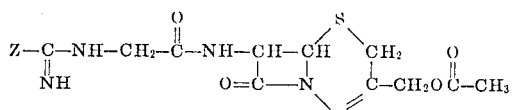

and

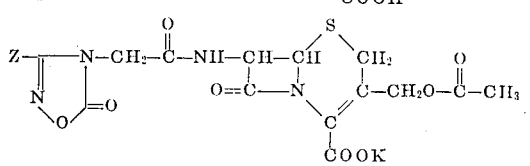

wherein Z is

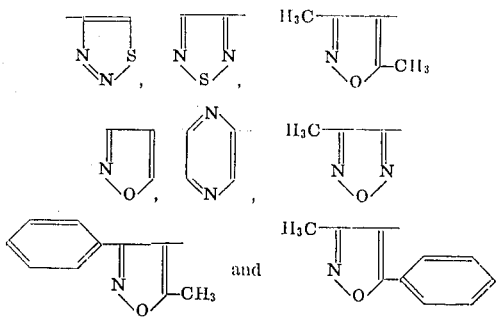

When necessary the amide is prepared by converting the corresponding acid to its acid chloride with thionyl chloride and thence to the amide by treatment of the acid chloride with ammonia in the usual manner.

EXAMPLE 7

The procedures of Example 2 are repeated while replacing the benzonitrile used therein with an equimolar weight of the nitrile of the formula R — CN wherein R is dichloromethyl, trichloromethyl, n-propyl, isopropyl, n-butyl, isobutyl, sec-butyl, t-butyl, n-pentyl, cyclobutyl, cyclopentyl, cyclohexyl and cycloheptyl, respectively to produce, respectively, the corresponding compounds of the formulas

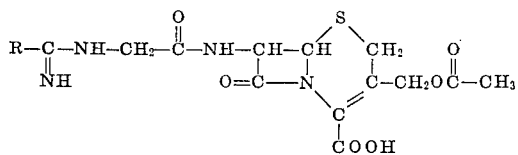

and

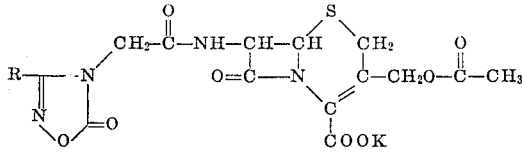

EXAMPLE 8

7-[N-(Phenylacetimidoyl)aminoacetamido]cephalosporanic acid

A solution of 3-benzyl-1,2,4-oxadiazole-5-one-4-acetyl chloride (prepared from 5.0 g., 0.0214 mole of the acid) in 90 ml. of acetone was added in one portion to a rapidly stirred mixture of 5.72 g. (0.0214 mole) of 7-aminocephalosporanic acid, 7.2 g. (0.0856 mole) of sodium bicarbonate, 150 ml. of water and 60 ml. of acetone at room temperature. After stirring for 45 minutes the reaction mixture was extracted twice with ethyl acetate, the ethyl acetate extracts being discarded. The aqueous phase was layered with ethyl acetate and acidified with 42 percent phosphoric acid. Two more extractions with ethyl acetate were made. A quantity of solid separated during the second extraction and was removed by filtration. The combined ethyl acetate extracts were washed three times with water, dried with sodium sulfate, filtered, and treated with 8.1 ml. (0.0214 mole) of sodium 2-ethylhexanoate in 1-butanol giving a crystalline precipitate. The mixture was concentrated somewhat to remove any remaining water. The product, sodium 7-(3-benzyl-1,2,4-oxadiazole-5-one-4-acetamido)cephalosporanate, was collected by filtration and washed with ethyl acetate (designated solid A). The filtrate was stripped of solvent and the residue triturated with anhydrous ether giving a filterable solid (designated solid B); yield 0.2 g. Solid A was extracted by stirring with 500 ml. of acetone. The insoluble portion (designated solid C, 7.1 g.) was removed by filtration. The filtrate was stripped of solvent and the residue triturated with anhydrous ether giving a filterable solid (designated solid D); yield 0.2 g. Solids B and D were concluded from their infrared spectra to be good quality sodium 7-(3-benzyl-1,2,4-oxadiazole-5-one-4-acetamido)cephalosporanate.

A solution of solid C in water was layered with ethyl acetate and acidified with 42 percent phosphoric acid. Two more extractions of the aqueous phase were made with ethyl acetate. The combined organic extracts were washed three times with water, dried with sodium sulfate, filtered and the solvent stripped off at reduced pressure. To the residue was added 500 ml. of water and the mixture stirred for about one hour in a water bath at 40° causing the product, 7-(3-benzyl-1,2,4-oxadiazole-5-one-4-acetamido)cephalosporanic acid, to crystallize; yield after air drying, 4.2 g. The infrared spectrum was consistent for good quality material.

A suspension of 4.2 g. of 7-(3-benzyl-1,2,4-oxadiazole-5-one-4-acetamido)cephalosporanic acid, 0.2 g. of solid B and 0.2 g. of solid D in 200 ml. of water was brought into solution by addition of solid sodium bicarbonate to pH 6.5. The solution was hydrogenated in the presence of commercial Raney nickel catalyst (No. 28) on a Parr hydrogenation apparatus at an initial pressure of 50 p.s.i. at room temperature for 2 hours. During this time the theoretical amount of hydrogen was taken up. The catalyst was removed by filtration. The filtrate was adjusted to pH 4.5 with 6 N hydrochloric acid and concentrated to dryness. To the residue was added ethyl acetate and this stripped out to remove any remaining water. The process was repeated once using acetone in place of ethyl acetate giving a solid residue. The residue was extracted with 75 ml. of warm 95 percent ethanol the insoluble material being removed by filtration. The filtrate was stored in the cold overnight and filtered to remove a small amount of solid. The filtrate was concentrated to a volume of about 50 ml. and diluted quickly with 50 ml. of acetone. The precipitate which immediately separated was filtered off. The filtrate was stored for about 1 hour at room temperature while the product separated. The product, 7-[N-(phenylacetimidoyl)aminoacetamido]cephalosporanic acid, was filtered, washed with acetone, dried in vacuo over phosphorus pentoxide and further dried for 4 hours in a vacuum oven at 60°; yield 1.34 g., decomposes 168°–170° with prior darkening above about 160°. The infrared and nuclear magnetic resonance spectra were consistent for the desired product.

EXAMPLE 9

Potassium 7-(3-phenyl-1,2,4-oxadiazole-5-one-4-acetamido)desacetoxycephalosporanate A suspension of 1.5 g. of 3-phenyl-1,2,4-oxadiazole-5-one-4-acetic acid in 60 ml. of methylene chloride was gassed with hydrogen chloride briefly and 1.66 g. of phosphorus pentachloride added. The mixture was stirred at room temperature for 2 hours. The solvent was removed at reduced pressure from the solution leaving 3-phenyl-1,2,4-oxadiazole-5-one-4-acetyl chloride as an oil.

A solution of 3-phenyl-1,2,4-oxadiazole-5-one-4-acetyl chloride in a small amount of acetone was added slowly with stirring to a mixture of 1.45 g. of 7-amino-desacetoxycephalosporanic acid, 1.14 g. of sodium bicarbonate, 40 ml. of water and 40 ml. of acetone while maintaining pH 7–8 with sodium bicarbonate. The mixture was stirred for 0.5 hour while being maintained at about pH 7.5 with hydrochloric acid. The reaction mixture was diluted with 40 ml. of water and extracted with ethyl acetate. The aqueous phase was acidified with 42 percent phosphoric acid and extracted three times with ethyl acetate. The combined organic extracts were washed three times with water, dried with sodium sulfate and treated with 2.5 ml. (0.0068 mole) of potassium 2-ethylhexanoate in 1butanol giving a crystalline product. The product was filtered, washed with ethyl acetate and dried; yield 2.45 g., decomposes 180°–185°. The infrared and nuclear magnetic resonance spectra were consistent for potassium 7-(3-phenyl-1,2,4-oxadiazole-5-one-4-acetamido)desacetoxycephalosporanate.

Anal. Calcd. for $C_{18}H_{15}N_4O_6SK \cdot 2H_2O$: C, 44.07; H, 3.90; N, 11.42.
Found: C, 43.73; H, 3.84; N, 11.32.

EXAMPLE 10

7-[N-(Benzimidoyl)aminoacetamido]desacetoxycephalosporanic acid

A solution of 2.1 g. of potassium 7-(3-phenyl-1,2,4-oxadiazole-5-one-4-acetamido)desacetoxycephalosporanate in 200 ml. of water was hydrogenated in the presence of commercial Raney nickel catalyst on a Parr hydrogenation apparatus at room temperature at an initial pressure of 50 p.s.i. for 2 hours. The catalyst was removed by filtration. The filtrate was adjusted to pH 4.8 with 6 N hydrochloric acid and concentrated to dryness at reduced pressure. The residue was triturated with anhydrous ether producing a filterable solid; yield 1.6 g. The material was crystallized by dissolving in water and then adding acetone to the cloud point; yield after drying in vacuo over phosphorus pentoxide, 0.39 g., decomposes 183°–187°. The infrared and nuclear magnetic resonance spectra were consistent for the desired product.

EXAMPLE 11

7-(3-Benzyl-1,2,4-oxadiazole-5-one-4-acetamido)-3-(1-pyridylmethyl)-3-cepheme-4-carboxylic acid betaine A mixture of 8 g. of 7-(3-benzyl-1,2,4-oxadiazole-5-one-4-acetamido)cephalosporanic acid, 32 g. of potassium thiocyanate, 8 ml. of water and 4 ml. of pyridine was heated at 60°–65° for 5 hours. To the reaction mixture which had been stored at room temperature overnight was added 100 ml. of water. The resulting solution was slowly acidified to pH 2 with 6 N hydrochloric acid with ice cooling. The aqueous phase was decanted from the gummy precipitate. The precipitate was triturated three times with water and the resulting solid, 7-(3-benzyl-1,2,4-oxadiazole-5-one-4-acetamido)-3-(1-pyridylmethyl)-3-cepheme-4-carboxylic acid thiocyanate was collected by filtration. The solid was suspended in 150 ml. of water plus 40 ml. of a 25 percent solution of "Amberlite LA-1" resin acetate form in toluene [Spencer et al., J. Med. Chem. 9, 746 (1966), footnote 14] and the mixture stirred for 1 hour. The toluene-resin phase was separated and 40 ml. of a 25 percent solution of "Amberlite LA-1" resin acetate form in methyl isobutyl ketone was added and the mixture stirred for 1 hour. The resulting emulsion was extracted six times with anhydrous ether. The aqueous phase was filtered and stored in the refrigerator overnight. The water was stripped off at reduced pressure. Ethyl acetate was added to the residue and this stripped out to remove any remaining water. The ethyl acetate treatment was repeated once. The solid was triturated with anhydrous ether and filtered giving 2.2 g. of 7-(3-benzyl-1,2,4-oxadiazole-5-one-4-acetamido)-3-(1-pyridylmethyl)-3-cepheme-4-carboxylic acid betaine; melts 130°–135°, Dec. 135°–145°.

"Amberlite LA-1" resin is a mixture of secondary amines wherein each secondary amine has the formula

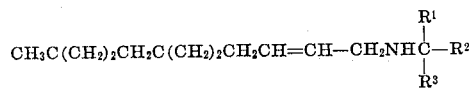

wherein each of $R^1$, $R^2$ and $R^3$ is an aliphatic hydrocarbon radical and wherein $R^1$, $R^2$ and $R^3$ contain in the aggregate from 11 to 14 carbon atoms; this particular mixture of secondary amines, which is sometimes referred to as "Liquid Amine Mixture No. I, is a clear amber liquid having the following physical characteristics: viscosity at 25° C. of 70 cps.; specific gravity at 20° C. of 0.845; refractive index at 25° C. of 1.467; distillation range at 10 mm.: up to 160° C. — 74%, above 220° C. — 17%.

EXAMPLE 12

7-[N-(Phenylacetimidoyl)aminoacetamido]-3-(1-pyridylmethyl)-3-cepheme-4-carboxylic acid chloride hydrochloride A solution of 2.1 g. of 7-(3-benzyl-1,2,4-oxadiazole-5-one-4-acetamido)-3-(1-pyridylmethyl)-3-cepheme-4-carboxylic acid betaine in 150 ml. of water and 50 ml. of dioxane plus 0.5 ml. of glacial acetic acid was hydrogenated in the presence of commercial Raney nickel catalyst (No. 28) on a Parr hydrogenation apparatus at an initial pressure of 50 p.s.i. at room temperature for 1.5 hours. The catalyst was removed by filtration. The filtrate was concentrated to dryness at reduced pressure, i.e. stripped. Ethyl acetate was added to the residue and stripped out to remove any remaining water. The ethyl acetate procedure was repeated once. To the residue was added 30 ml. of water and 2 ml. of 6 N hydrochloric acid and the resulting solution stripped to dryness at reduced pressure. The residue was dissolved in 20 ml. of water and again stripped to dryness. To the residue was added ethyl acetate and this stripped out to remove remaining water. The treatment with ethyl acetate was repeated once. The residue was triturated with acetone giving after filtration and drying in vacuo over phosphorus pentoxide 1.2 g. of product; gradually decomposes above about 140°.

EXAMPLE 13

3-(2-Thenyl)-1,2,4-oxadiazole-5-one

A mixture of 148 g. of distilled 2-thiopheneacetonitrile, 97.3 g. of hydroxylamine hydrochloride, 74.1 g. of sodium carbonate, 600 ml. of methanol and 360 ml. of water was heated at 50° for 19.5 hours. The methanol was stripped off at reduced pressure. The product, 2-thiopheneacetamide oxime, separated as an oil. The oil was extracted into 600 ml. of chloroform. The chloroform extract was washed three times with water, dried over sodium sulfate and concentrated to a volume of about 500 ml.

Ethyl chloroformate (114.4 ml.) was added from a dropping funnel to a solution of the above obtained 2-thiopheneacetamide oxime in chloroform plus on additional 500 ml. of chloroform and 168 ml. of triethylamine with cooling to keep the temperature from rising above 25°. After the addition of ethyl chloroformate was complete the solvent was distilled off at reduced pressure. The residue was extracted with water to remove triethylamine hydrochloride. The organic phase was further stripped at reduced pressure to remove all solvent leaving an oil as residue. To the residue was added a solution of 72 g. of sodium hydroxide in 600 ml. of water and the mixture heated to 75° during 15 minutes. The solution was cooled to room temperature and twice extracted with benzene. The aqueous phase was carbon treated and acidified with cooling to pH 3.5 causing the product to crystallize. The product was filtered, washed with water and air dried; yield 108.9 g. The product was purified by dissolving in aqueous sodium hydroxide (24 g. of sodium hydroxide in 500 ml. of water), carbon treating the solution and acidifying with concentrated hydrochloric acid. There was obtained 84.3 g. of 3-(2-thenyl)-1,2,4-oxadiazole-5-one, m.p. 96°–97.5°.

3-(2-Thenyl)-1,2,4-oxadiazole-5-one-4-acetic acid

A stirred mixture of 18.2 g. of 3-(2-thenyl)-1,2,4-oxadiazole-5-one, 28 ml. of triethylamine, 16.7 g. of bromoacetic acid and 300 ml. of tetrahydrofuran was heated at 50° overnight. The precipitate of triethylamine hydrobromide was removed by filtration. The filtrate was stripped at reduced pressure to remove solvent. Water (100 ml.) and sufficient 20 percent sodium hydroxide were added to the residue to give a solution. The solution was acidified with concentrated hydrochloric acid causing the product to separate as an oil. The mixture was layered with benzene and concentrated to a volume of about 50 ml. at reduced pressure. The concentrate was extracted twice with ethyl acetate. The combined ethyl acetate extracts were washed with water, dried over sodium sulfate, filtered and the filtrate treated with 31 ml. (0.081 mole) of sodium 2-ethylhexanoate in 1-butanol causing sodium 3-(2-thenyl)-1,2,4-oxadiazole-5-one-4-acetate to crystallize. The product was filtered and washed well with ethyl acetate; yield 7.0 g. The infrared spectrum was consistent for the desired product. Acidification of an aqueous solution of the sodium salt produced the crystalline free acid, 3-(2-thenyl)-1,2,4-oxadiazole-5-one-4-acetic acid.

Sodium 7-[3-(2-Thenyl)-1,2,4-oxadiazole-5-one-4-acetamido]cephalosporanate

A solution of 3-(2-thenyl)-1,2,4-oxadiazole-5-one-4-acetic acid prepared from 6.5 g. of the sodium salt in 85 ml. of methylene chloride was gassed for a few minutes with anhydrous hydrogen chloride, 6.7 g. of phosphorus pentachloride was added (effervescence) and the mixture stirred at room temperature for 25 minutes. The solvent was distilled off at reduced pressure. The residue was triturated by decantation with cyclohexane and finally the solvent was completely removed at reduced pressure giving 3-(2-thenyl)-1,2,4-oxadiazole-5-one-4-acetyl chloride.

A solution of the acid chloride in 25 ml. of methylene chloride was added to a stirred solution of 7.4 g. of 7-aminocephalosporanic acid and 8.7 ml. of triethylamine at room temperature. The reaction mixture was stirred at room temperature for 1 hour. The methylene chloride was stripped off at reduced pressure and the residue was dissolved in 200 ml. of water. The acidified (42 percent phosphoric acid) aqueous solution was extracted three times with ethyl acetate. The combined ethyl acetate extracts were washed twice with water, dried with sodium sulfate, filtered, concentrated somewhat to remove any remaining water and treated with 9.4 ml. (1 equiv.) of sodium 2-ethylhexanoate in 1-butanol. The crystalline product was collected by filtration and stored in a desiccator (solid A). The filtrate was stripped of solvent at reduced pressure and the residue triturated with anhydrous ether. The product was filtered and washed with anhydrous ether (solid B); yield 5.7 g. The infrared and nuclear magnetic resonance spectra of solid B were consistent for the product, sodium 7-[3-(2-thenyl)-1,2,4-oxadiazole-5-one-4-acetamido]cephalosporanate. Solid A was concluded to be a mixture of product and the sodium salt of the side chain acid. A suspension of solid A in ethyl acetate-acetone was stirred for 5–10 minutes and the insoluble portion filtered off. The filtrate was concentrated to a small volume, a small amount of precipitate was removed by filtration and the filtrate was concentrated to dryness. The residue was triturated with anhydrous ether giving an additional 1.32 g. of good quality product.

7-[N-(2-thienylacetimidoyl)aminoacetamido]-cephalosporanic acid

Sodium 7-[3-(2-thenyl)-1,2,4-oxadiazole-5-one-4-acetamido]cephalosporanate (6.8 g.) was combined with 200 ml. of water and the system adjusted to pH 7.6 with sodium bicarbonate giving a slightly hazy solution. The filtered solution was adjusted to pH 7.3 with 6 N hydrochloric acid and hydrogenated in the presence of Raney nickel catalyst at an initial pressure of 50 p.s.i. at room temperature on a Parr hydrogenation apparatus for 1.75 hours. The catalyst was removed by filtration. The filtrate was adjusted to pH 2.7 with 6 N hydrochloric acid and a small amount of insoluble material filtered off. The filtrate was adjusted to pH 4.2 with sodium hydroxide and stripped to dryness at reduced pressure. The residue was treated several times with ethyl acetate and this stripped out to remove all water. The residue was dissolved in 80 ml. of methanol, diluted with 80 ml. of acetone and filtered twice. The filtrate after storage in the cold overnight was filtered and stripped to dryness. The residue was triturated with acetone producing a filterable solid; yield 1.53 g. The solid was extracted with 1:1 95 percent ethanol-acetone. The insoluble portion was removed by filtration. The filtrate was diluted with acetone causing the product to precipitate. The product was collected by filtration and washed with acetone. The insoluble portion was again extracted with 1:1 ethanol-acetone and the extract worked up in the same way giving a second crop of product; total yield of both crops 0.17 g. The infrared and nuclear magnetic resonance spectra were consistent for the desired product.

The filtrates from both crops of product were combined, stripped to dryness and the residue triturated with anhydrous ether to given an additional 0.27 g. of product of somewhat poorer quality.

EXAMPLE 14

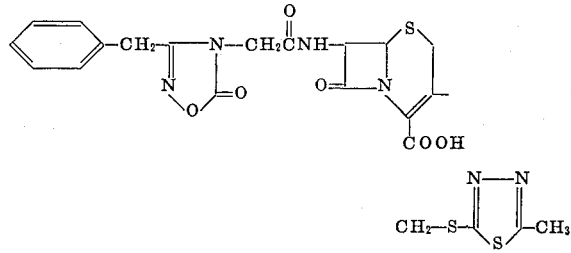

7-(3-Benzyl-1,2,4-oxadiazole-5-one-4-acetamido)-3-(2-methyl-1,3,4-thiadiazol-5-ylthio)methylceph-3-em-4-carboxylic acid and sodium salt A solution of sodium 7-(3-benzyl-1,2,4-oxadiazole-5-one-4-acetamido)cephalosporanate in pH 6.4 phosphate buffer and an equivalent amount of 2-mercapto-5-methyl-1,3,4-thiadiazole is stirred at 60° for 4 to 6 hours. The reaction mixture is acidified to pH 2 with 6 N hydrochloric acid and extracted with ethyl acetate. The organic phase is washed with water, dried with sodium sulfate, filtered, and evaporated in vacuo to give the free acid.

The sodium salt is prepared by treating an ethyl acetate solution of the free acid with an equivalent amount of sodium 2-ethylhexanoate in 1-butanol.

EXAMPLE 15

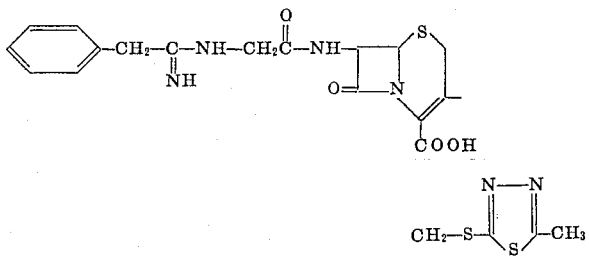

7-[N-(Phenylacetimidoyl)aminoacetamido]-3-(2-methyl-1,3,4-thiadiazol-5-ylthio)methylceph-3-em-4-carboxylic acid A solution of 7-(3-benzyl-1,2,4-oxadiazole-5-one-4-acetamido)-3-(2-methyl-1,3,4-thiadiazol-5-ylthio)methylceph-3-em-4-carboxylic acid in dioxane is hydrogenated in the presence of Raney nickel catalyst at an initial pressure of 50 p.s.i. on a Parr hydrogenation apparatus at room temperature for 2 hours. The catalyst is removed by filtration. The filtrate is evaporated at reduced pressure to give the product.

EXAMPLE 16

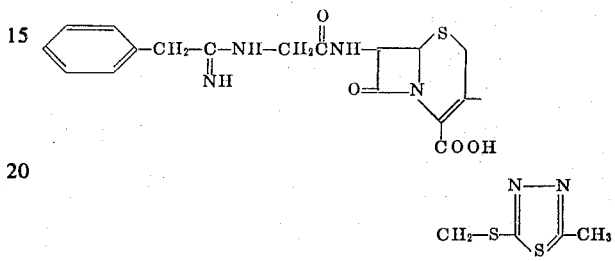

7-[N-(Phenylacetimidoyl)aminoacetamido]-3-(2-methyl-1,3,4-thiadiazol-5-ylthio)methylceph-3-em-4-carboxylic acid A solution of sodium 7-(3-benzyl-1,2,4-oxadiazole-5-one-4-acetamido)-3-(2-methyl-1,3,4-thiadiazol-5-ylthio)methylceph-3-em-4-carboxylate in aqueous dioxane is hydrogenated in the presence of Raney nickel catalyst at an initial pressure of 50 p.s.i. on a Parr hydrogenation apparatus at room temperature for 2 hours. The catalyst is removed by filtration. The filtrate is adjusted to pH 4.5 and evaporated to a small volume giving the product.

EXAMPLE 17

3-(3-Thenyl)-1,2,4-oxadiazole-5-one

A mixture of 155.6 g. of 3-thiopheneacetonitrile, 105.08 g. of hydroxylamine hydrochloride, 80.12 g. of sodium carbonate, 600 ml. of methanol and 360 ml. of water was heated at 50° for 18 hours. The methanol was stripped off at reduced pressure. The product, 3-thiopheneacetamide oxime, separated as an oil. The oil was extracted into 600 ml. of chloroform. The chloroform extract was washed three times with water and dried over sodium sulfate causing the oxime to crystallize. The product was removed from the sulfate by dissolving it with 600 ml. of tetrahydrofuran and filtering off the sodium sulfate. The solvent was removed from the filtrate at reduced pressure. The crystalline residue was dissolved in 1000 ml. of chloroform containing 176.4 ml. of triethylamine.

Ethyl chloroformate (120.1 ml.) was added from a dropping funnel to the above obtained solution of 3-thiopheneacetamide oxime with cooling to keep the temperature from rising above 25°. After the addition of ethyl chloroformate was complete the solvent was distilled off at reduced pressure. The residue was extracted with water to remove triethylamine hydrochloride. The organic phase was further stripped at reduced pressure to remove all solvent leaving an oil as residue. To the residue was added a solution of 75.6 g. of sodium hydroxide in 600 ml. of water and the mixture heated to 75° during 15 minutes. The solution was cooled to room temperature and twice extracted with benzene. The aqueous phase was carbon treated and acidified with cooling to pH 3.5 causing the product to crystallize. The product was collected by filtration, washed with water and air dried. The product was purified by recrystallization from benzene; yield 51.0 g. The product was further purified by dissolving in aqueous sodium hydroxide (11.24 g. of sodium hydroxide in 300 ml. of water) and acidifying with concentrated hydrochloric acid. There was obtained 47.5 g. of 3-(3-thenyl)-1,2,4-oxadiazole-5-one, m.p. 63°–64.5°.

Sodium 3-(3-Thenyl)-1,2,4-oxadiazole-5-one-4-acetate

A stirred, dry mixture of 47.4 g. of 3-(3-thenyl-1,2,4-oxadiazole-5-one, 72.8 ml. of triethylamine, 43.4 g. of bromoacetic acid and 750 ml. of tetrahydrofuran was heated at 50° overnight. The precipitate of triethylamine hydrobromide was removed by filtration. The filtrate was stripped at reduced pressure to remove solvent. Water (300 ml.) and sufficient 20 percent sodium hydroxide were added to the residue to give a solution. The solution was carbon treated, cooled and acidified with concentrated hydrochloric acid causing the acid form of the product to separate as an oil. The mixture was extracted twice with ethyl acetate. The combined ethyl acetate extracts were washed with water, dried over sodium sulfate, filtered and the filtrate treated with 79.0 ml. (0.080 mole) of sodium 2-ethylhexanoate in 1-butanol causing sodium 3-(3-thenyl)-1,2,4-oxadiazole-5-one-4-acetate to crystallize. The product was collected by filtration and washed well with ethyl acetate; yield 13.8 g. The infrared spectrum was consistent for the desired product.

Sodium 7-[3-(3-thenyl)-1,2,4-oxadiazole-5-one-4-acetamido]cephalosporanate

A solution of 3-(3-thenyl)-1,2,4-oxadiazole-5-one-4-acetic acid prepared from 6.5 g. of the sodium salt in 85 ml. of methylene chloride was gassed for a few minutes with anhydrous hydrogen chloride. Then 6.7 g. of phosphorus pentachloride was added (effervescence) and the mixture stirred at room temperature for 25 minutes. The solvent was distilled off at reduced pressure. The residue was triturated by decantation with cyclohexane and finally the solvent was completely removed at reduced pressure giving 3-(3-thenyl)-1,2,4-oxadiazole-5-one-4-acetyl chloride.

A solution of the acid chloride in 25 ml. of methylene chloride was added to a stirred solution of 7.4 g. of 7-aminocephalosporanic acid and 8.7 ml. of triethylamine at room temperature. The reaction mixture was stirred at room temperature for 1 hour. The methylene chloride was stripped off at reduced pressure and the residue was dissolved in 200 ml. of water. The acidified (42 percent phosphoric acid) aqueous solution was extracted 3 times with ethyl acetate. The combined ethyl acetate extracts were washed twice with water, dried with sodium sulfate, filtered, concentrated somewhat to remove any remaining water and treated with 9.4 ml. (1 eqv.) of sodium 2-ethylhexanoate in 1-butanol. The product separated as a gum. Decantation of the solvent and trituration of the residue with fresh ethyl acetate produced solid product. The product was collected by filtration and washed well with ethyl acetate (solid A); yield 9.4 g. The decanted solvent and washings were combined and stripped at reduced pressure. The residue was triturated with anhydrous ether. The product was collected by filtration and washed with anhydrous ether (solid B); yield 2.7 g. The infrared spectra of solid A and B indicated them to be mixtures of product and the sodium salt of the side chain acid. Each was suspended in acetone and stirred for 5–10 minutes. The insoluble portions were filtered off and the filtrates concentrated to dryness. The residues were triturated with anhydrous ether giving solids C and D; yield 7.6 g. and 2.2 g. respectively. The infrared spectra indicated both samples to be good quality product as the sodium salt.

7-[N-(3-thienylacetimidoyl)aminoacetamid]-cephalosporanic acid

Sodium 7-[3-(3-thenyl)-1,2,4-oxadiazole-5-one-4-acetamido]cephalosporanate (5.0 g.) was combined with 200 ml. of water and the system adjusted to pH 7.8 with sodium bicarbonate giving a clear solution. The solution was hydrogenated in the presence of Raney nickel catalyst at an initial pressure of 50 p.s.i. at room temperature on a Parr hydrogenation apparatus for 1.5 hours. The catalyst was removed by filtration. The filtrate was adjusted to pH 4.2 with 6 N hydrochloric acid and some insoluble material separated. After concentration to a small volume at reduced pressure the material was collected by filtration (solid A); yield 1.4 g. The filtrate was stripped to dryness at reduced pressure. The residue was treated several times with ethyl acetate and this stripped out to remove all water. The residue was dissolved in 30 ml. methanol, filtered to remove insoluble sodium chloride, diluted with 30 ml. acetone filtered again and stored in the refrigerator overnight. The product which had crystallized was collected by filtration and washed sparingly with acetone (solid B); yield 0.96 g.; its infrared and nuclear magnetic resonance spectra were consistent for the desired product. Solid A was concluded to be a mixture of product and unreduced starting material.

I claim:

1. A compound having the formula

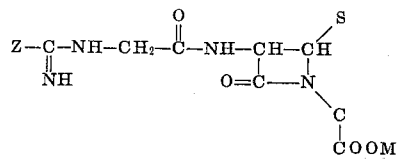

wherein A is hydrogen, acetoxy, 2-(5-methyl-1,3,4-thiadiazolyl)thio, pyridinium, picolinium or lutidinium; and M is hydrogen, a pharmaceutically acceptable, nontoxic cation or an anionic charge when A is one of said quaternary ammonium radicals; and wherein Z is (lower)alkyl, cycloalkyl having four, five, six or seven carbon atoms, monohalo(lower)alkyl, dichloromethyl, trichloromethyl, (lower)alkenyl of two to six carbon atoms,

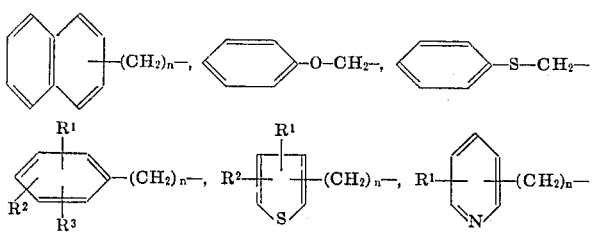

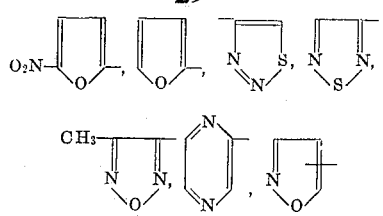

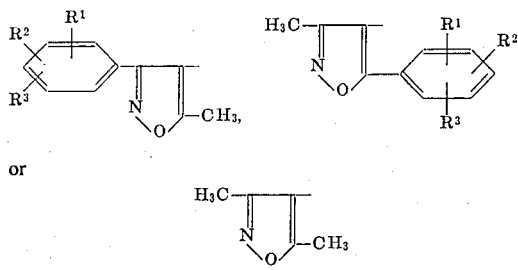

or wherein n is 0 or 1 and R¹, R² and R³ each is hydrogen, nitro, di(lower)alkylamino, (lower)alkanoylamino, (lower)alkanoyloxy, (lower)alkyl, amino, hydroxy, (lower)alkylthio, (lower)alkoxy, sulfamyl, chloro, iodo, bromo, fluoro or trifluoromethyl.

2. A compound of claim 1 wherein Z is phenyl, benzyl, thenyl, thienyl, furyl or (lower)alkyl.

3. A compound of claim 1 wherein Z is phenyl, benzyl, p-chlorobenzyl, 2-thenyl or 3-thenyl.

4. A compound of claim 1 wherein Z has the structure

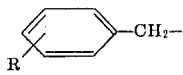

wherein R is hydrogen, hydroxy, amino, methyl, methoxy or chloro.

5. A compound of claim 4 wherein A is hydrogen.
6. A compound of claim 4 wherein A is acetoxy.
7. A compound of claim 4 wherein A is pyridinium.
8. A compound of claim 4 wherein A is 2-(5-methyl-1,3,4-thiadiazolyl)thio.
9. The compound having the formula

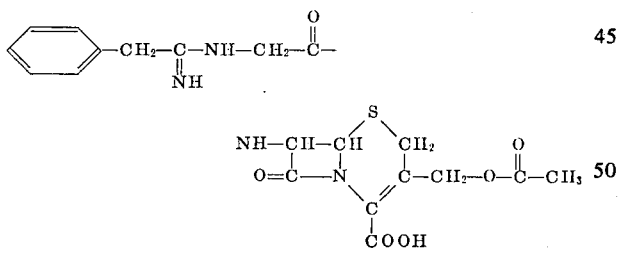

10. A nontoxic, pharmaceutically acceptable salt of the compound of claim 9.
11. The sodium salt of the compound of claim 9.
12. The potassium salt of the compound of claim 9.
13. The hydrochloride of the compound of claim 9.
14. The zwitterion form of the compound of claim 9.
15. The compound having the formula

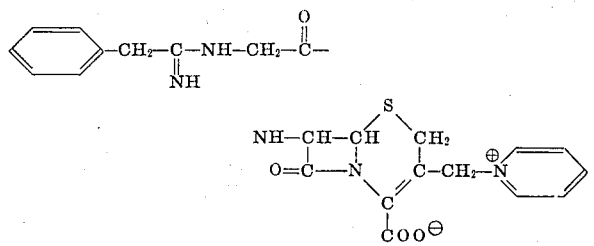

16. The compound having the formula

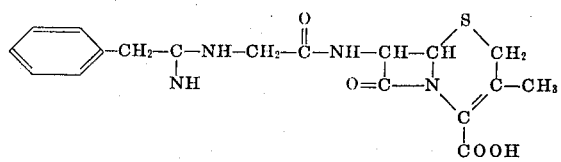

or its sodium or its potassium salt.

17. The compound having the formula

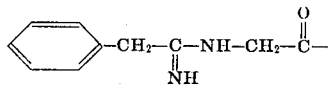

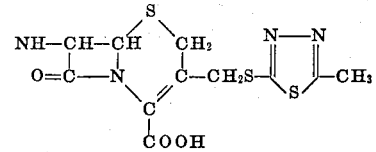

or its sodium or its potassium salt.

18. A compound of claim 1 having the formula

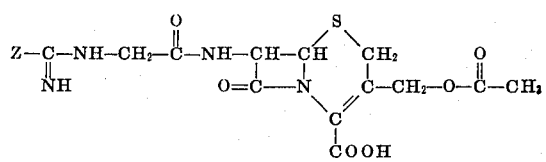

wherein Z is p-chlorobenzyl, phenyl, 2-thenyl or 3-thenyl.

19. A compound of claim 1 having the formula

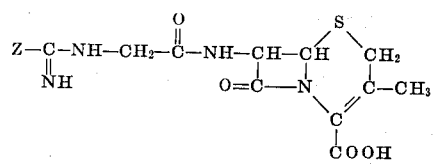

wherein Z is p-chlorobenzyl, phenyl, 2-thenyl or 3-thenyl.

20. A compound of claim 1 having the formula

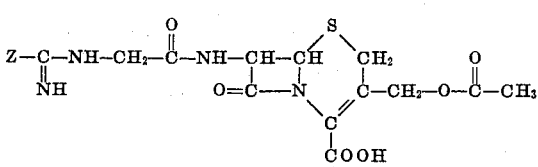

wherein Z is p-chlorobenzyl, phenyl, 2-thenyl or 3-thenyl.

21. A compound of claim 1 having the formula

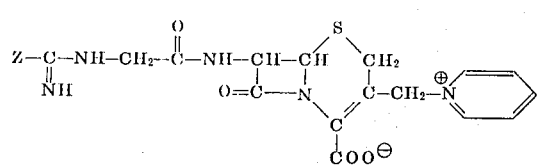

wherein Z is p-chlorobenzyl, phenyl, 2-thenyl or 3-thenyl.

* * * * *